June 24, 1958  J. W. BISHOP  2,839,884
SICKLE GUARD EXTENSION FOR CUTTER BAR
Filed Dec. 23, 1955  2 Sheets-Sheet 2

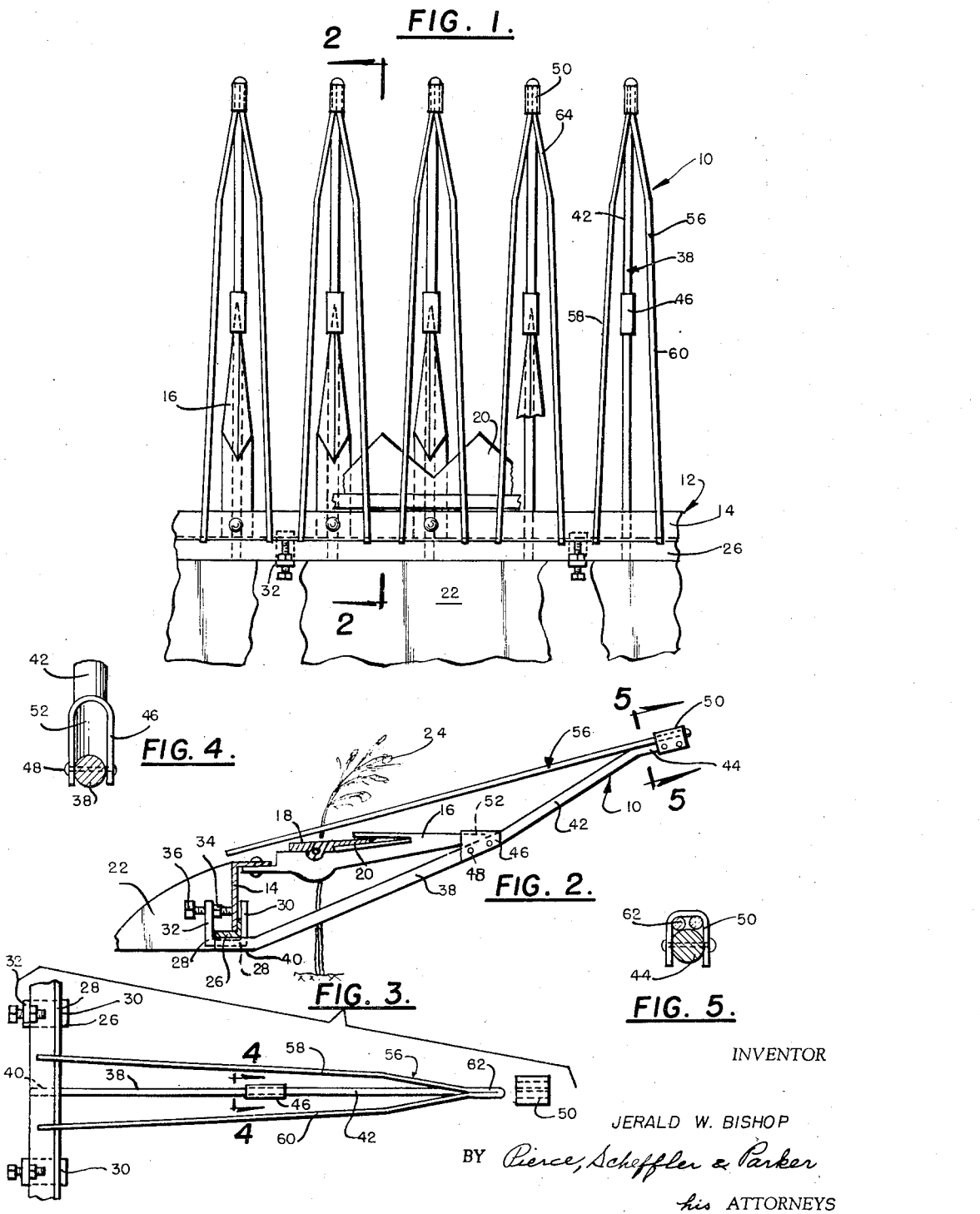

INVENTOR
JERALD W. BISHOP
BY *Pierce, Scheffler & Parker*
his ATTORNEYS

United States Patent Office 2,839,884
Patented June 24, 1958

2,839,884

SICKLE GUARD EXTENSION FOR CUTTER BAR

Jerald W. Bishop, Downs, Kans., assignor to Richardson Manufacturing Company, Cawker City, Kans., a copartnership Application December 23, 1955, Serial No. 555,022

8 Claims. (Cl. 56—318)

This invention relates to combines and other harvesting machines and in particular to an attachment for the cutter bars of such machines to increase the harvesting efficiency.

In harvesting many crops such as milo, many of the heads of the grains or seed are lost when a cutter bar of conventional construction is used. This, of course, results in decreased yield and less financial return on the crops. Accordingly, an object of my invention is to provide a cutter bar attachment for use with harvesting machinery which will save the grain heretofore lost.

A considerable amount of the loss of grain results from the heads falling forwardly or to the side of the sickle section of the cutter bar assembly when the ordinary construction is used. Even though the heads are above the cutting point they may be leaning forwardly, as related to the sickle position, and as a result they drop down ahead of the sickle section and guards or between the guards. It is therefore a further object of my invention to provide an attachment which will prevent loss even though the heads fall forwardly of the sickle section or guards.

Another object of my invention is to provide a cutter bar attachment which will support heads of grain which drop forwardly of the sickle section and cause such grain to be directed rearwardly over the sickle section for deposit in the collector unit.

Yet a further object of my invention is to provide an attachment for cutter bars comprising an array of flexible tines which will support and direct heads of grain rearwardly of the cutter bar assembly, yet which will not interfere with the passage or movement of stalks to the sickle section.

A further object of my invention is to provide an attachment for cutter bars which will support and direct heads of grain rearwardly of the bar assembly, yet will not interfere with the normal cutting of the stalk between the sickle section and the ledger plate in the cutter bar.

A further object of my invention is to provide an attachment for cutter bars which will support and direct heads of grain rearwardly of the cutter bar assembly without requiring assistance from the reel, thus allowing the reel to be adjusted for optimum performance in various crop conditions without having to consider the effect of the reel adjustment on cutter bar losses.

It is also among the objects of my invention to provide a cutter bar attachment which is of simple construction yet which is adequate for the task, thus assuring manufacture and sale at a reasonable cost and long, trouble-free operation.

A still further object of my invention is to provide an attachment which can be easily associated with a cutter bar assembly and which can be connected or attached without alteration or redesigning of the cutter bar. Thus the attachment can be used on existing harvesters.

A more specific object of my invention is to provide an attachment for a cutter bar assembly comprised of an array of closely spaced, flexible tines located transversely of and above the cutter bar assembly, the tines reaching out in front of the sickle section, as measured in the direction of travel, to catch and retrieve the heads of the crop which fall in the forward direction, the tines having a backward pitch, i. e. being inclined downwardly from their forward ends so as to cause the heads of the crop when severed to roll backward upon the tines to the auger, or canvas, or whatever type of head collector unit is included on the machine.

These and other objects and advantages will become apparent from the following description and the accompanying drawings in which:

Figure 1 is a fragmentary top plan view illustrating an attachment constructed in accordance with the invention connected to a cutter bar assembly;

Figure 2 is a sectional elevational view taken along line 2—2 of Figure 1;

Figure 3 is a fragmentary top plan view of the attachment;

Figure 4 is an enlarged sectional view taken along line 4—4 of Figure 3;

Figure 5 is an enlarged sectional view taken along line 5—5 of Figure 2, and

Similar reference characters in the several figures indicate similar elements.

Figure 6:
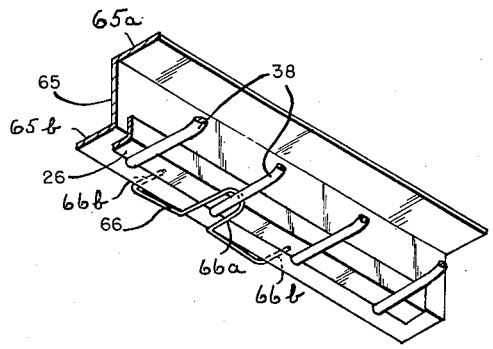
Figures 6, 7 and 8 are fragmentary perspective views looking at the underside of different types of cutter bar assemblies and showing the correspondingly adapted means for attaching the crop head retrieving tines in accordance with the invention.

Referring now in particular to the drawings, reference character 10 indicates a cutter bar attachment in accordance with the invention, and in Fig. 1, the attachment 10 is shown connected to a cutter bar assembly 12 of a harvesting machine or combine, the latter structure being omitted in the interest of simplifying the disclosure since it is not essential to an understanding of the invention.

The cutter bar assembly usually includes a support member 14 which, in the illustrated embodiment, is constituted by an angle iron member. Knife or sickle guards 16 are attached to member 14 and project forwardly thereof, the guards extending across the width of member 14 in spaced parallel relation. A knife 18 is reciprocatingly mounted on the rear portion of the guards 16. The teeth 20 of knife 18 cooperate with stationary edge portions of the guard structure in cutting the grain as is well known. A platform 22 extends rearwardly of the cutter bar assembly and normally receives the severed grain. However, if the head of a severed stalk were situated as indicated in Figure 2 (see 24), it might well fall to the ground immediately after being severed. The attachment 10, in accordance with the present invention, however, will prevent this loss.

As seen in the drawings, the attachment comprises an array of highly flexible tines located above the cutter bar assembly. The tines extend forward of the sickle section and have a backward pitch, i. e. they slope rearwardly downward so as to cause the cut-off heads falling upon the tines to roll backward into the collector unit, and they are arranged sufficiently close together so as to prevent any of the heads from falling through the spaces therebetween. Moreover, the tines are made very flexible so as to yield easily and permit the reciprocating cutter element to engage the stalks directly with the stationary cutting edge, i. e. the ledger plate forming a part of the guard component of the cutter bar.

The mode of attachment of the tine assembly to the cutter bar assembly may vary depending upon the arrangement of the cutter bar. However, in the embodiment illustrated in Figs. 1–5, the attachment for the tines comprises a base member 26 of angle iron having clamps 28 secured thereto, such as by welding, in spaced relation along the length of the base member which is generally coextensive in length with the cutter bar assembly. Each of the clamps 28 includes upwardly extending facing flanges 30, 32, a nut 34 and a bolt 36. The bolt 36 is threadedly received in flange 32 and nut 34 serves as a lock nut. The base member 26 extends along and is attached to the angle member 14 of the cutter bar assembly at each clamp location by arranging the vertical side or plate of the angle between the flanges and then screwing in the threaded bolt 36 until it bears firmly against such side.

The base member 26 has attached to it a plurality of parallel spaced, forwardly extending rods 38. The lower ends 40 of these rods are, for example, welded to the base member 26 and the rods slope upwardly and forwardly, passing beneath the sickle section and guards and terminating at their outer ends 44 at a level considerably above and forward of the front ends of the guards. In accordance with the invention, a rod 38 is provided for each guard member 16 of the cutter bar assembly and it will be noted that each of the rods 38 is located below and in the plane of its associated guard 16. To maintain each of the rods in its upwardly sloping position, the invention provides for securing each of the rods 38 to its associated guard member 16. For this purpose, each rod 38 has attached to it, such as by riveting 48, an inverted U-shaped clip 46 so constructed as to provide a pocket 52 in which is fitted the leading tip portion of the guard 16.

Another clip member 50 is attached to the outer end portion 44 of each of the rods 38 and is likewise provided with a pocket for receiving the forward ends of one set i. e. one pair, of the tine elements. In the presently illustrated embodiment, each set of tine elements are made by bending a metallic rod 56 of comparatively small diameter to the shape shown in Fig. 3 thus to provide a front bight portion 62 which fits securely within the pocket of clip 50 and comparatively long, highly flexible, slightly divergent tines 58, 60 extending rearwardly and inclined downwardly. The tines 58, 60 extend over, but do not rest upon, the guards 16 and knife 18, and terminate rearwardly of the cutter bar member 14 so that the grain tops 24 cut off by the sickle action and falling upon the downwardly inclined array of tines 58, 60 will roll backward into the platform 22 as the harvester moves forward.

The divergent characteristic of the sets of tines 58, 60 facilitates passage of the stalks rearwardly to the sickle section for cutting, and being very long as compared with their diameter and therefore very flexible with respect to their point of attachment at the bight portion 62, the tines flex easily so as to permit the reciprocating sickle bar to engage the stalks directly with the cooperating stationary cutting edge of ledger plate forming a part of the guard structure.

In the usual cutter bar construction the distance between centers of adjacent guards is about 4 inches. Since the invention provides a pair of tines associated with each guard, the tines themselves have an even closer spacing than the guards and consequently are only about 1½ or 2" apart. Such close spacing assures collection of all heads on the array of tines and a roll back thereon to the collecting unit rearwardly of the cutter bar assembly.

As previously indicated, the tine attachment, in accordance with the present invention, may be required to be fastened to the cutter bar assembly of the harvester in a manner different from that shown in Figs. 1–5 dependent upon the shape of the frame member. Three such different modes of fastening are illustrated in Figs. 6–8.

With reference now to Fig. 6, the frame member of the cutter bar unit of the harvester is seen to have a vertical plate portion 65 and upper and lower horizontal flange portions 65a, 65b extending in opposite directions with respect to the plate portion 65. For this construction of frame member, the angle base member 26 of the tine attachment is fastened to the frame member by placing the inside angle surface of the same under and flat against the outside angle surface formed by the corner or junction of the vertical plate 65 and lower flange portion 65b and utilizing a flat spring member 66 having a central bight portion 66a which presses against the contacting faces of the flange 65b and base member 26, and end portions 66b which are sprung up and overlie the upper face of the lower flange portion 65b.

Figure 7:
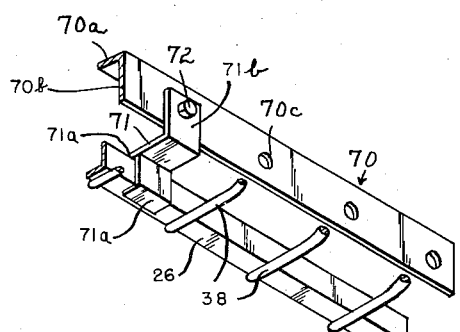

In Fig. 7, the frame member 70 of the cutter bar assembly, is seen to be comprised of angle iron, one face 70a of which extends horizontally and the other face 70b of which depends vertically. Here, the angle base member 26 of the tine attachment is secured to the frame member 70 by means of a plurality of spaced clamps or brackets, one of which is indicated at 71. Each clamp 71 is provided with two flange portions 71a spaced apart by a distance corresponding to the width of one face of the angle base member 26, such face being fitted between the flanges and secured thereto such as by welding. Each clamp 71 also includes an upwardly extending flange portion 71b having an aperture aligned with a corresponding aperture 70c in the depending face of frame member 70 for receiving a bolt 72 by which the base member 26 of the attachment is thus secured to the frame member 70.

Figure 8:
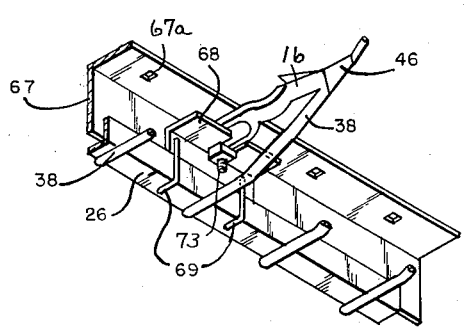

In Fig. 8 still another mode of fastening for the tine attachment is disclosed. Here the frame member 67 is likewise seen to be comprised of angle iron but differs from the Fig. 7 construction in that the top, horizontal face of the member is provided with spaced apertures 67a and bolts 73 for attaching the guard members 16. For this construction which is thus similar to Fig. 1, the tine attachment is fastened to the frame member 67 by means of a clamp or bracket including a plate portion 68 having a slot adapted to receive the same bolt 73 by which each guard is attached to the frame member. The plate portion 68 is thus secured in place at the under side of the top horizontal flange of the frame member 67 when the bolt 73 is tightened, and depending L-shaped fingers 69 on the plate portion 68 which are applied against the back faces of the angle base member 26 serve to hold the vertical front face of the latter firmly pressed against the vertical plate portion of the frame member 67.

In conclusion, it will be evident that the present invention provides a comparatively simple and yet highly effective tine attachment to overlie and extend forward of the sickle section of a cutter bar assembly for the purpose of catching falling stalk heads and causing the latter to roll back onto the collecting element thus improving the efficiency of the harvesting mechanism and bringing about a higher yield per acre of the grain harvested.

Also, while preferred constructions have been described and illustrated, these may be departed from in minor detail without departing from the spirit and scope of the invention as defined in the appended claims.

I claim:

1. For use with a cutter bar assembly of a harvesting machine such as a combine including a transversely extending support, a plurality of sickle guards extending forwardly of said support in parallel spaced relation and a sickle extending transversely of said guards having cutting edges cooperative with stationary cutting edges on said guards; an attachment for retrieving and delivering crop heads cut off by said sickle rearwardly to a head collecting unit, said attachment comprising an elongated base member extending parallel with said transversely extending support of said cutter bar assembly, means for rigidly and detachably securing said base member to said cutter bar assembly support, a plurality of parallel spaced rods secured at their rear ends to said base member and extending transversely thereto in the direction of and underlying said guards, said rods being sloped upwardly with the forward end thereof terminating in advance of and above the front ends of said guards, means providing a pocket member on each of said rods intermediate the ends thereof for receiving the forward end of the correspondingly positioned guard, and a pair of flexible tines secured at their front ends to the forward end of each of said rods, the tines of each pair extending backward in a downwardly sloped manner on opposite sides of the vertical plane containing the corresponding rod and guard and terminating rearwardly of the cutting edges of said sickle thereby to provide for backward movement on said tines of crop heads cut off by said sickle to a collecting unit located rearward of said cutter bar assembly.

2. A cutter bar assembly and crop head retrieving and delivering attachment therefor as defined in claim 1 wherein the tines of each pair are constituted by a single length of material having a centrall located forward attaching bight portion and two rearwardly extending tines.

3. A cutter bar assembly and crop head retrieving and delivering attachment therefor as defined in claim 2 and which further includes means disposed on the forward end of each rod having a pocket for receiving the bight portion of each pair of tines.

4. A cutter bar assembly and crop head retrieving and delivering attachment therefor as defined in claim 1, wherein said support comprises a vertical plate and wherein the means for attaching said base member to said plate comprises sets of facing flanges spaced along and secured to said base member and a bolt threaded through one flange of each set, said plate being located between said flanges and being held in fixed relation thereto upon threading in said bolts so that the ends thereof bear against said plate.

5. A cutter bar assembly and crop head retrieving and delivering attachment therefor as defined in claim 1 wherein said support of said cutter bar assembly and said base member of said attachment are each constituted by angle members having vertical and horizontal faces in face to face contact, and wherein said means for attaching said angle members together comprises a flat spring having an intermediate bight portion underlying the horizontal contacting faces of said angle members and surrounding one of said rods and end portions extending in the same direction as said bight portion and which are sprung up to overlie the upper side of the horizontal face of the angle member constituting said support.

6. A cutter bar assembly and crop head retrieving and delivering attachment therefor as defined in claim 1 wherein said support of said cutter bar assembly and said base member of said attachment are each constituted by angle members, and wherein said means for attaching said angle members together comprises a bracket having spaced flanges within which said angle member constituting said base member is seated and secured thereto, and means bolting said bracket to one face of said angle member constituting said support.

7. A cutter bar assembly and crop head retrieving and delivering attachment therefor as defined in claim 1 wherein said support of said cutter bar assembly and said base member of said attachment are each constituted by angle members having vertical and horizontal faces, the vertical faces being seated against each other and with the lower edge of the vertical face of said angle member constituting said support resting upon the horizontal face of said angle member constituting said base member, and wherein said means for attaching said angle members together comprise a bracket bolted to the horizontal face of said angle member constituting said support, said bracket being provided with lower finger portions seated against the underside of the horizontal face of said angle member constituting said base member.

8. A cutter bar assembly and crop head retrieving and delivering attachment therefor as defined in claim 1 wherein the tines of each pair diverge in the rearward direction.

References Cited in the file of this patent

UNITED STATES PATENTS

| | | |
|---|---|---|
| 1,733,061 | Hofer | Oct. 22, 1929 |
| 2,203,418 | Mills | June 4, 1940 |
| 2,552,623 | Dye | May 15, 1951 |
| 2,577,324 | Goesch | Dec. 4, 1951 |
| 2,746,231 | Ayers | May 22, 1956 |

FOREIGN PATENTS

| | | |
|---|---|---|
| 198,631 | Switzerland | July 15, 1938 |